(12) United States Patent
Erwin et al.

(10) Patent No.: US 9,870,009 B2
(45) Date of Patent: Jan. 16, 2018

(54) HVAC SYSTEM WITH IMPROVED CONTROL SWITCHING

(71) Applicant: Trane International Inc., Davidson, NC (US)

(72) Inventors: William Randall Erwin, Tyler, TX (US); Bradley Thomas Wilson, Tyler, TX (US)

(73) Assignee: Trane International Inc., Davidson, NC (US)

( * ) Notice: Subject to any disclaimer, the term of this patent is extended or adjusted under 35 U.S.C. 154(b) by 0 days.

(21) Appl. No.: 15/282,712

(22) Filed: Sep. 30, 2016

(65) Prior Publication Data

US 2017/0023955 A1   Jan. 26, 2017

Related U.S. Application Data

(63) Continuation of application No. 14/170,277, filed on Jan. 31, 2014, now Pat. No. 9,459,634.

(60) Provisional application No. 61/762,763, filed on Feb. 8, 2013.

(51) Int. Cl.
| | |
|---|---|
| *G05D 23/19* | (2006.01) |
| *H01H 9/20* | (2006.01) |
| *H02M 7/06* | (2006.01) |
| *H01H 47/26* | (2006.01) |

(52) U.S. Cl.
CPC .............. *G05D 23/19* (2013.01); *H01H 9/20* (2013.01); *H02M 7/06* (2013.01)

(58) Field of Classification Search
CPC ........... H01H 47/26; H01H 9/20; H02M 7/06; G05D 23/19
See application file for complete search history.

(56) References Cited

U.S. PATENT DOCUMENTS

| | | |
|---|---|---|
| 4,598,330 A | 7/1986 | Woodworth |
| 4,704,652 A | 11/1987 | Billings |
| 6,886,754 B2 | 5/2005 | Smith et al. |
| 7,598,631 B2 | 10/2009 | Szabados et al. |
| 8,274,240 B2 | 9/2012 | Salvestrini |
| 8,278,839 B2 | 10/2012 | Salvestrini et al. |
| 9,459,634 B2 | 10/2016 | Erwin et al. |

OTHER PUBLICATIONS

Notice of Allowance dated Jun. 6, 2016; U.S. Appl. No. 14/170,277, filed Jan. 31, 2014; 10 pages.

*Primary Examiner* — Robert Deberadinis
(74) *Attorney, Agent, or Firm* — Conley Rose, P.C.; J. Robert Brown, Jr.

(57) ABSTRACT

An HVAC switching circuit may comprise a current source circuit charging a capacitor used to power an HVAC DC power relay coil. The power relay coil terminal is connected to an activation control circuit which comprises at least one of (1) each of (a) a threshold circuit which activates a first transistor to energize the power relay coil when the voltage across the threshold circuit reaches a first threshold value and (b) a regenerative feedback circuit configured to lower the first threshold value to a second threshold voltage, and (2) a voltage divider connected between a first terminal on the power relay coil and the negative DC supply, and a programmable shunt regulator, configured as a level triggered switch, programmed by the voltage divider and connected between the second power relay coil terminal and the negative DC supply.

20 Claims, 5 Drawing Sheets

HVAC SYSTEM WITH IMPROVED CONTROL SWITCHING

CROSS-REFERENCE TO RELATED APPLICATIONS

This application is a continuation of prior filed, co-pending U.S. patent application Ser. No. 14/170,277 filed on Jan. 31, 2014 by William Randall Erwin, et al., entitled "HVAC System With Improved Control Switching," which claims priority to U.S. Provisional Patent Application No. 61/762,763 filed on Feb. 8, 2013 by William Randall Erwin, et al., entitled "HVAC System With Improved Control Switching," which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Heating, ventilation, and/or air conditioning (HVAC) systems with thermostats may be used to control the indoor temperature of buildings. HVAC systems may be controlled by settings for heating, ventilation, cooling, humidity, and air quality. Typically, the thermostat provides a signal to another HVAC component to activate the component when a temperature passes a threshold temperature setting. The thermostat may provide power to a relay that turns on or off power to an HVAC component. The thermostat may provide a signal which is an alternating current (AC) signal. The power provided to the HVAC component may be AC power.

SUMMARY

In some embodiments of the disclosure, a heating, ventilation, and/or air conditioning (HVAC) switching circuit is disclosed as comprising: an alternating current (AC) power source; at least one external control signal relay connected to the AC power source; an interlock switch connected to the AC power source; a full wave rectifier configured to receive an alternating current (AC) from the AC power source and output a direct current (DC) when each of the at least one external control signal relay and the interlock switch are closed; and a power relay activation control circuit comprising at least one capacitor, wherein the power relay activation control circuit is configured to receive the direct current from the full wave rectifier and provide actuation control of a power relay in response to a voltage exceeding a predetermined threshold switching voltage.

In other embodiments of the disclosure, a heating, ventilation, and/or air conditioning (HVAC) system is disclosed as comprising: an alternating current (AC) power source; a thermostat comprising at least one external control signal relay connected to the AC power source; an interlock switch connected to the AC power source; a full wave rectifier configured to receive an alternating current (AC) from the AC power source and output a direct current (DC) when each of the at least one external control signal relay and the interlock switch are closed; and a power relay activation control circuit comprising at least one capacitor, wherein the power relay activation control circuit is configured to receive the direct current from the full wave rectifier and provide actuation control of a power relay in response to a voltage exceeding a predetermined threshold switching voltage.

In yet other embodiments of the disclosure, a method of operating a heating ventilation and/or air conditioning (HVAC) system is disclosed as comprising: providing an alternating current (AC) power source to a thermostat comprising at least one external control signal relay connected to the AC power source; providing an interlock switch coupled to the thermostat; receiving an alternating current (AC) from the AC power source and outputting a direct current (DC) when each of the at least one external control signal relay and the interlock switch are closed; receiving the direct current from the full wave rectifier by a power relay activation control circuit; and actuating control of a power relay in response to a voltage exceeding a predetermined threshold switching voltage.

DETAILED DESCRIPTION

General purpose direct current (DC) coil printed circuit board (PCB) mounted relays may be used in place of large contactors and alternating current (AC) coil panel mount relays. Providing DC coils on PCB relays may reduce noise, space requirements, and cost. To implement a DC coil relay in place of an AC coil relay when a power supply and a control signal are the same, the supply/signal may be rectified and/or filtered. However, using a large capacitance to filter or smooth the control/power waveform may result in 1) high in-rush current when the capacitor begins to charge and/or 2) extended and soft relay turn off while the capacitor and DC coil discharge, both of which may reduce system reliability.

Depending upon the application, in-rush currents may greatly exceed the capacity of the switching device that applies the AC control signal. HVAC examples of such switching devices may be thermostat relays and interlock relays. Adding sufficient series resistance to the charge circuit may not be a viable option in many cases. For example, the resistance required to limit the in-rush current may reduce the voltage applied to the relay coil to below "pick-up" voltage at the minimum operating voltage range and at elevated temperatures. Therefore, series resistance may cause the circuit to fail under conditions within the desired design tolerance ranges.

Extended and soft relay turn off may be due to the residual coil voltage decay or back electromotive force (EMF) present whenever the AC control signal is removed, and the voltage across the coil changes. This residual coil voltage decay may be a function of the RC time constant of the coil resistance and the filter capacitance. The slow turn off of the relay may greatly reduce the life of the relay contacts in high power switching applications.

Embodiments disclosed herein may address one or more of the above concerns by at least one of 1) adding a current source charge circuit and 2) adding a threshold sensing switch circuit with or without regenerative feedback. In addition, the charge circuit may be full wave rectified to reduce the capacitance value of the filter capacitor. The result may enhance reliability by limiting in-rush currents to within the control switch ratings and by providing a sharp relay turn off control signal.

Figure 1:
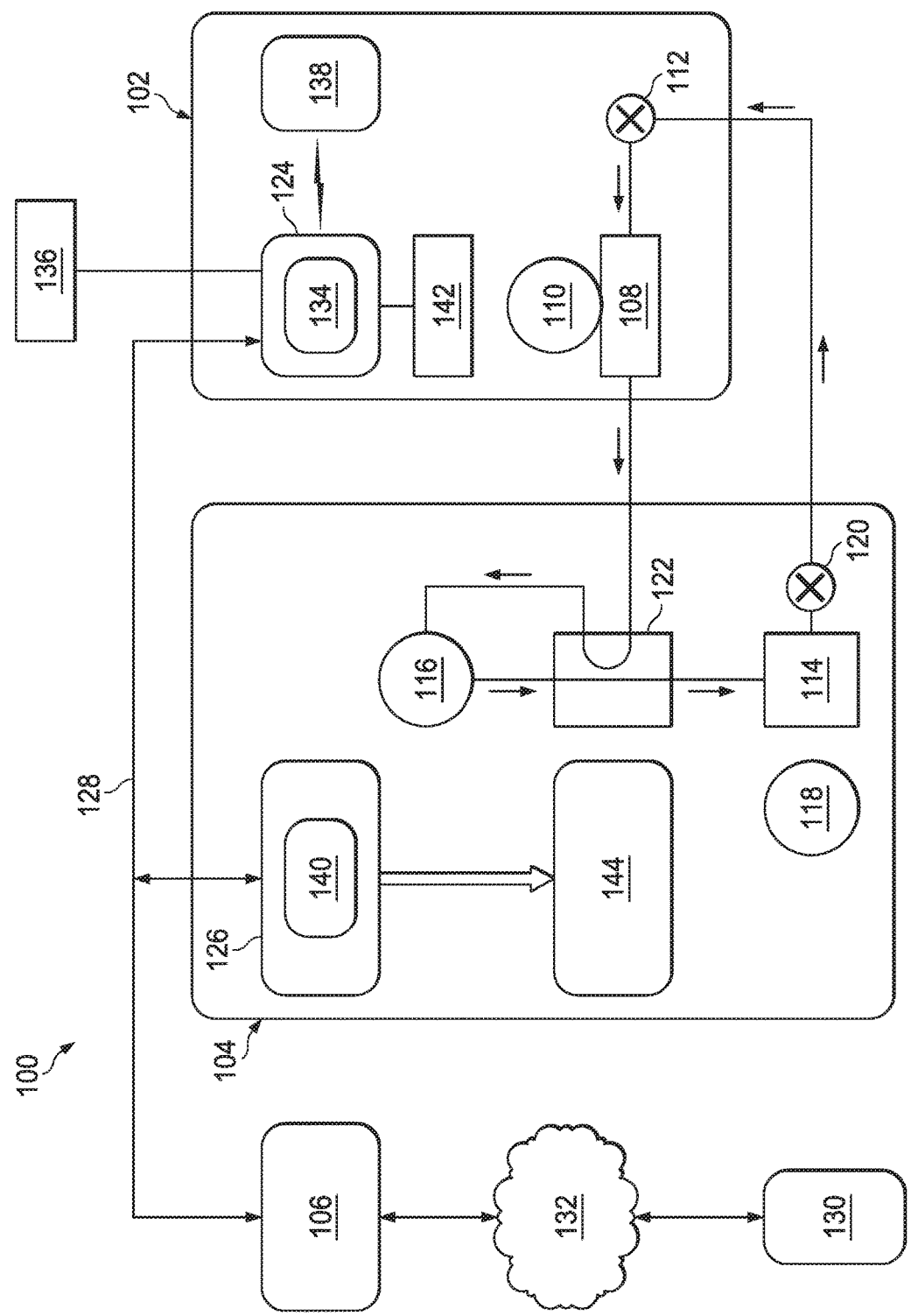
FIG. 1 is a schematic diagram of an HVAC system according to an embodiment of the disclosure.
Figure 2:
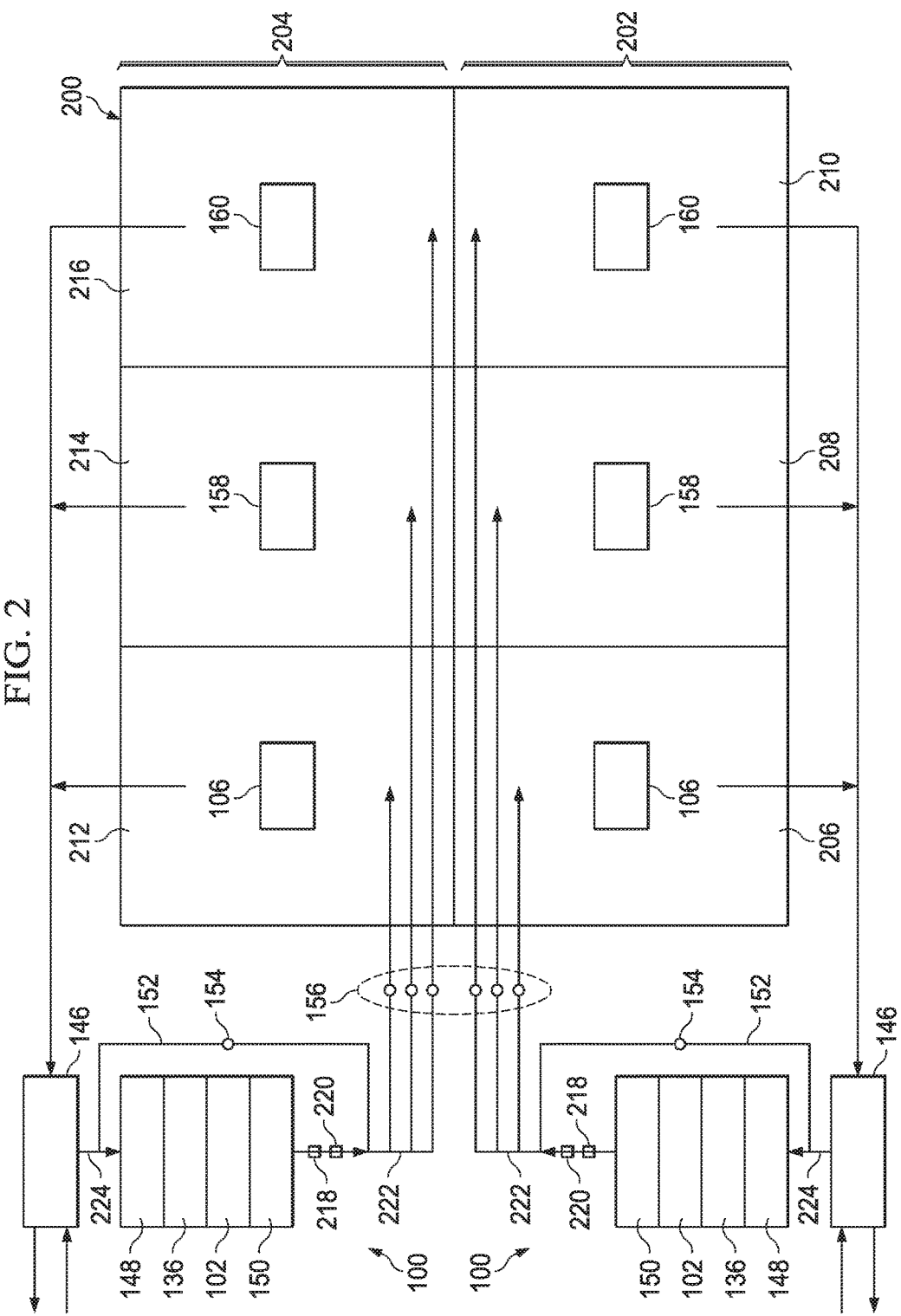
FIG. 2 is a simplified schematic diagram of the air circulation paths of the HVAC system of FIG. 1.
Figure 3:
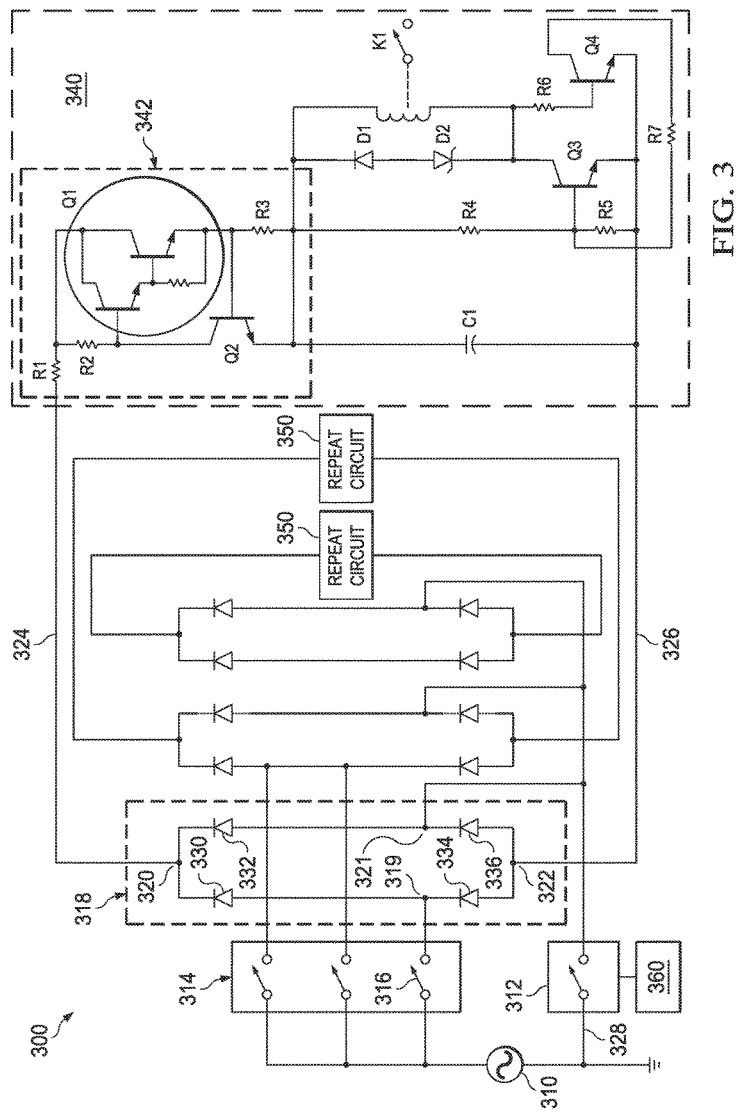
FIG. 3 is a diagram of an HVAC circuit according to an embodiment of the disclosure.
Figure 4:
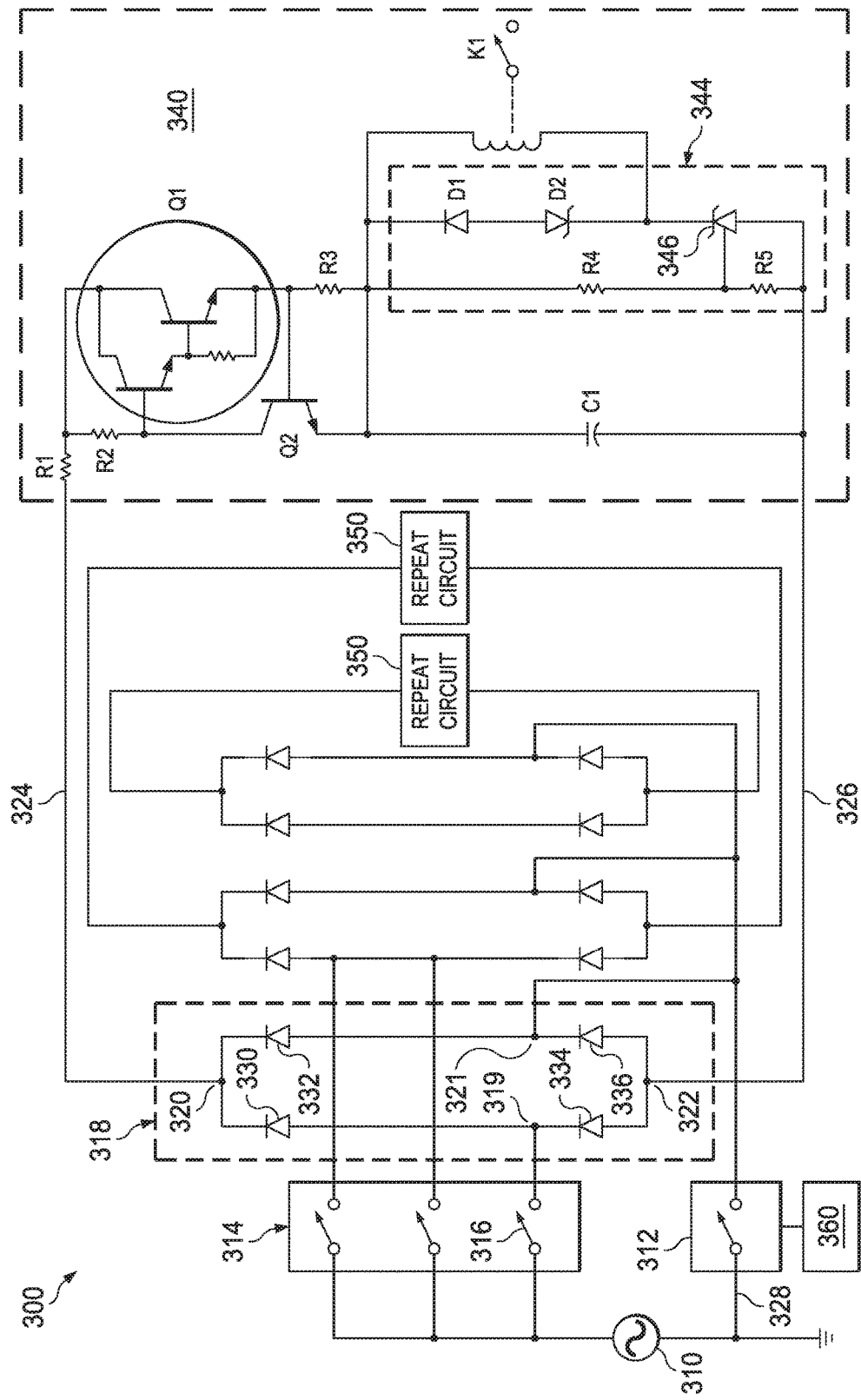
FIG. 4 is a diagram of an HVAC power circuit according to another embodiment of the disclosure.
Figure 5:
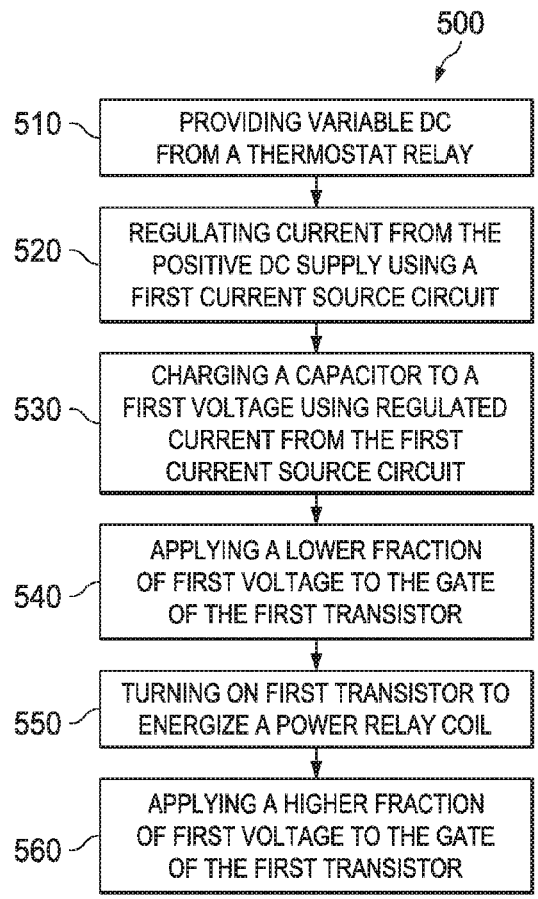
FIG. 5 is a flowchart of a method of operating a power relay in an HVAC system according to an embodiment of the disclosure.

FIGS. 1 and 2 show components of an HVAC system 100 while FIGS. 3-5 show switching embodiments that may be utilized by HVAC system 100 components.

Referring now to FIG. 1, a schematic diagram of an HVAC system 100 according to an embodiment of this disclosure is shown. HVAC system 100 comprises an indoor unit 102, an outdoor unit 104, and a system controller 106. In some embodiments, the system controller 106 may operate to control operation of the indoor unit 102 and/or the outdoor unit 104. As shown, the HVAC system 100 is a so-called heat pump system that may be selectively operated to implement one or more substantially closed thermodynamic refrigeration cycles to provide a cooling functionality and/or a heating functionality.

Indoor unit 102 comprises an indoor heat exchanger 108, an indoor fan 110, and an indoor metering device 112. Indoor heat exchanger 108 is a plate fin heat exchanger configured to allow heat exchange between refrigerant carried within internal tubing of the indoor heat exchanger 108 and fluids that contact the indoor heat exchanger 108 but that are kept segregated from the refrigerant. In other embodiments, indoor heat exchanger 108 may comprise a spine fin heat exchanger, a microchannel heat exchanger, or any other suitable type of heat exchanger.

The indoor fan 110 is a centrifugal blower comprising a blower housing, a blower impeller at least partially disposed within the blower housing, and a blower motor configured to selectively rotate the blower impeller. In other embodiments, the indoor fan 110 may comprise a mixed-flow fan and/or any other suitable type of fan. The indoor fan 110 is configured as a modulating and/or variable speed fan capable of being operated at many speeds over one or more ranges of speeds. In other embodiments, the indoor fan 110 may be configured as a multiple speed fan capable of being operated at a plurality of operating speeds by selectively electrically powering different ones of multiple electromagnetic windings of a motor of the indoor fan 110. In yet other embodiments, the indoor fan 110 may be a single speed fan.

The indoor metering device 112 is an electronically controlled motor driven electronic expansion valve (EEV). In alternative embodiments, the indoor metering device 112 may comprise a thermostatic expansion valve, a capillary tube assembly, and/or any other suitable metering device. The indoor metering device 112 may comprise and/or be associated with a refrigerant check valve and/or refrigerant bypass for use when a direction of refrigerant flow through the indoor metering device 112 is such that the indoor metering device 112 is not intended to meter or otherwise substantially restrict flow of the refrigerant through the indoor metering device 112.

Outdoor unit 104 comprises an outdoor heat exchanger 114, a compressor 116, an outdoor fan 118, an outdoor metering device 120, a reversing valve 122. Outdoor heat exchanger 114 is a spine fin heat exchanger configured to allow heat exchange between refrigerant carried within internal passages of the outdoor heat exchanger 114 and fluids that contact the outdoor heat exchanger 114 but that are kept segregated from the refrigerant. In other embodiments, outdoor heat exchanger 114 may comprise a plate fin heat exchanger, a microchannel heat exchanger, or any other suitable type of heat exchanger.

The compressor 116 is a multiple speed scroll type compressor configured to selectively pump refrigerant at a plurality of mass flow rates. In alternative embodiments, the compressor 116 may comprise a modulating compressor capable of operation over one or more speed ranges, the compressor 116 may comprise a reciprocating type compressor, the compressor 116 may be a single speed compressor, and/or the compressor 116 may comprise any other suitable refrigerant compressor and/or refrigerant pump.

The outdoor fan 118 is an axial fan comprising a fan blade assembly and fan motor configured to selectively rotate the fan blade assembly. In other embodiments, the outdoor fan 118 may comprise a mixed-flow fan, a centrifugal blower, and/or any other suitable type of fan and/or blower. The outdoor fan 118 is configured as a modulating and/or variable speed fan capable of being operated at many speeds over one or more ranges of speeds. In other embodiments, the outdoor fan 118 may be configured as a multiple speed fan capable of being operated at a plurality of operating speeds by selectively electrically powering different ones of multiple electromagnetic windings of a motor of the outdoor fan 118. In yet other embodiments, the outdoor fan 118 may be a single speed fan.

The outdoor metering device 120 is a thermostatic expansion valve. In alternative embodiments, the outdoor metering device 120 may comprise an electronically controlled motor driven EEV, a capillary tube assembly, and/or any other suitable metering device. The outdoor metering device 120 may comprise and/or be associated with a refrigerant check valve and/or refrigerant bypass for use when a direction of refrigerant flow through the outdoor metering device 120 is such that the outdoor metering device 120 is not intended to meter or otherwise substantially restrict flow of the refrigerant through the outdoor metering device 120.

The reversing valve 122 is a so-called four-way reversing valve. The reversing valve 122 may be selectively controlled to alter a flow path of refrigerant in the HVAC system 100 as described in greater detail below. The reversing valve 122 may comprise an electrical solenoid or other device configured to selectively move a component of the reversing valve 122 between operational positions. The system controller 106 may comprise a touchscreen interface for displaying information and for receiving user inputs. The system controller 106 may display information related to the operation of the HVAC system 100 and may receive user inputs related to operation of the HVAC system 100. However, the system controller 106 may further be operable to display information and receive user inputs tangentially and/or unrelated to operation of the HVAC system 100. In some embodiments, the system controller 106 may comprise a temperature sensor and may further be configured to control heating and/or cooling of zones associated with the HVAC system 100. In some embodiments, the system controller 106 may be configured as a thermostat for controlling supply of conditioned air to zones associated with the HVAC system 100.

In some embodiments, the system controller 106 may selectively communicate with an indoor controller 124 of the indoor unit 102, with an outdoor controller 126 of the outdoor unit 104, and/or with other components of the HVAC system 100. In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system 100 components configured for interfacing with the communication bus 128.

Still further, the system controller 106 may be configured to selectively communicate with HVAC system 100 components and/or other devices 130 via a communication network 132. In some embodiments, the communication network 132 may comprise a telephone network and the other device 130 may comprise a telephone. In some embodiments, the communication network 132 may comprise the Internet and the other device 130 may comprise a computer, a so-called smartphone, and/or other Internet enabled mobile telecommunication device.

The indoor controller 124 may be carried by the indoor unit 102 and may be configured to receive information inputs, transmit information outputs, and otherwise communicate with the system controller 106, the outdoor controller 126, and/or any other device via the communication bus 128 and/or any other suitable medium of communication. In some embodiments, the indoor controller 124 may be configured to communicate with an indoor personality module 134, receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134 may comprise information related to the identification and/or operation of the indoor unit 102 and/or a position of the outdoor metering device 120.

In some embodiments, the indoor EEV controller 138 may be configured to receive information regarding temperatures and pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112.

The outdoor controller 126 may be carried by the outdoor unit 104 and may be configured to receive information inputs, transmit information outputs, and otherwise communicate with the system controller 106, the indoor controller 124, and/or any other device via the communication bus 128 and/or any other suitable medium of communication. In some embodiments, the outdoor controller 126 may be configured to communicate with an outdoor personality module 140 that may comprise information related to the identification and/or operation of the outdoor unit 104.

In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the outdoor fan 118, a compressor sump heater, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with a compressor drive controller 144 that is configured to electrically power and/or control the compressor 116.

The HVAC system 100 is shown configured for operating in a so-called cooling mode in which heat is absorbed by refrigerant at the indoor heat exchanger 108 and heat is rejected from the refrigerant at the outdoor heat exchanger 114. In some embodiments, the compressor 116 may be operated to compress refrigerant and pump the relatively high temperature and high pressure compressed refrigerant from the compressor 116 to the outdoor heat exchanger 114 through the reversing valve 122 and to the outdoor heat exchanger 114. As the refrigerant is passed through the outdoor heat exchanger 114, the outdoor fan 118 may be operated to move air into contact with the outdoor heat exchanger 114, thereby transferring heat from the refrigerant to the air surrounding the outdoor heat exchanger 114. The refrigerant may primarily comprise liquid phase refrigerant and the refrigerant may be pumped from the outdoor heat exchanger 114 to the indoor metering device 112 through and/or around the outdoor metering device 120 which does not substantially impede flow of the refrigerant in the cooling mode. The indoor metering device 112 may meter passage of the refrigerant through the indoor metering device 112 so that the refrigerant downstream of the indoor metering device 112 is at a lower pressure than the refrigerant upstream of the indoor metering device 112. The pressure differential across the indoor metering device 112 allows the refrigerant downstream of the indoor metering device 112 to expand and/or at least partially convert to gaseous phase. The gaseous phase refrigerant may enter the indoor heat exchanger 108. As the refrigerant is passed through the indoor heat exchanger 108, the indoor fan 110 may be operated to move air into contact with the indoor heat exchanger 108, thereby transferring heat to the refrigerant from the air surrounding the indoor heat exchanger 108. The refrigerant may thereafter reenter the compressor 116 after passing through the reversing valve 122.

To operate the HVAC system 100 in the so-called heating mode, the reversing valve 122 may be controlled to alter the flow path of the refrigerant, the indoor metering device 112 may be disabled and/or bypassed, and the outdoor metering device 120 may be enabled. In the heating mode, refrigerant may flow from the compressor 116 to the indoor heat exchanger 108 through the reversing valve 122, the refrigerant may be substantially unaffected by the indoor metering device 112, the refrigerant may experience a pressure differential across the outdoor metering device 120, the refrigerant may pass through the outdoor heat exchanger 114, and the refrigerant may reenter the compressor 116 after passing through the reversing valve 122. Most generally, operation of the HVAC system 100 in the heating mode reverses the roles of the indoor heat exchanger 108 and the outdoor heat exchanger 114 as compared to their operation in the cooling mode.

Still further, the system controller 106 may be configured to selectively communicate with other systems via the communication network 132. In some embodiments, the system controller 106 may communicate with other devices 130, such as, telephones, smart phones, and/or personal computers.

Communication bus 128 may take the form of a three wire connection, as mentioned above. For example, the three wire connection may be implemented using standards such as ClimateTalk and BACnet. Communication bus 128 may alternatively comprise a CT-485 interface, a RS-485 interface, and/or an Ethernet 10BASE-T or 100BASE-TX interface, or any other suitable communication interface.

Referring now to FIG. 2, a simplified schematic diagram of the air circulation paths for a structure 200 conditioned by two HVAC systems 100 is shown. In this embodiment, the structure 200 is conceptualized as comprising a lower floor 202 and an upper floor 204. The lower floor 202 comprises zones 206, 208, and 210 while the upper floor 204 comprises zones 212, 214, and 216. The HVAC system 100 associated with the lower floor 202 is configured to circulate and/or condition air of lower zones 206, 208, and 210 while the HVAC system 100 associated with the upper floor 204 is configured to circulate and/or condition air of upper zones 212, 214, and 216.

In addition to the components of HVAC system 100 described above, in this embodiment, each HVAC system 100 further comprises a ventilator 146, a prefilter 148, a humidifier 150, and a bypass duct 152. The ventilator 146 may be operated to selectively exhaust circulating air to the environment and/or introduce environmental air into the circulating air. The prefilter 148 may generally comprise a filter media selected to catch and/or retain relatively large particulate matter prior to air exiting the prefilter 148 and entering the air cleaner 136. The humidifier 150 may be operated to adjust a humidity of the circulating air. The bypass duct 152 may be utilized to regulate air pressures within the ducts that form the circulating air flow paths. In some embodiments, air flow through the bypass duct 152 may be regulated by a bypass damper 154 while air flow delivered to the zones 206, 208, 210, 212, 214, and 216 may be regulated by zone dampers 156.

Still further, each HVAC system 100 may further comprise a zone thermostat 158 and a zone sensor 160. In some embodiments, a zone thermostat 158 may communicate with the system controller 106 and may allow a user to control a temperature, humidity, and/or other environmental setting for the zone in which the zone thermostat 158 is located. Further, the zone thermostat 158 may communicate with the system controller 106 to provide temperature, humidity, and/or other environmental feedback regarding the zone in which the zone thermostat 158 is located. In some embodiments, a zone sensor 160 may communicate with the system controller 106 to provide temperature, humidity, and/or other environmental feedback regarding the zone in which the zone sensor 160 is located.

While HVAC systems 100 are shown as a so-called split system comprising an indoor unit 102 located separately from the outdoor unit 104, alternative embodiments of an HVAC system 100 may comprise a so-called package system in which one or more of the components of the indoor unit 102 and one or more of the components of the outdoor unit 104 are carried together in a common housing or package. The HVAC system 100 is shown as a so-called ducted system where the indoor unit 102 is located remote from the conditioned zones, thereby requiring air ducts to route the circulating air. However, in alternative embodiments, an HVAC system 100 may be configured as a non-ducted system in which the indoor unit 102 and/or multiple indoor units 102 associated with an outdoor unit 104 is located substantially in the space and/or zone to be conditioned by the respective indoor units 102, thereby not requiring air ducts to route the air conditioned by the indoor units 102.

Still referring to FIG. 2, the system controllers 106 may be configured for bidirectional communication with each other and may further be configured so that a user may, using any of the system controllers 106, monitor and/or control any of the HVAC system 100 components regardless of which zones the components may be associated. Further, each system controller 106, each zone thermostat 158, and each zone sensor 160 may comprise a humidity sensor. As such, it will be appreciated that structure 200 is equipped with a plurality of humidity sensors in a plurality of different locations. In some embodiments, a user may effectively select which of the plurality of humidity sensors is used to control operation of one or more of the HVAC systems 100.

Referring now to FIG. 3, an embodiment an HVAC power circuit 300 comprising a DC relay circuit 340 which may help reduce in-rush current and ameliorate slow relay turn off is shown. AC power 310, for example, 24 VAC power, may be provided to the HVAC power circuit 300 via external control signal relays 316. The external control signal relays 316 may be located within a thermostat 314. The 24 VAC return current 328 may pass through an externally located interlock switch 312. The interlock switch 312 may be any type of persistent connection, such as a relay, mechanical switch, or semiconductor switch. The circuit control signal and power are one in the same. Circuit 340 may only operate in response to an applied signal when the interlock switch 312 is closed.

Interlock switch 312 may be controlled by circuit 360, which may limit turn-on and turn-off times of relay 312. In some embodiments, circuit 360 may comprise at least a portion of circuit 600 of FIG. 6.

With interlock switch 312 closed and switch 316 closed, 24 VAC may be applied to inputs 319 and 321 of the full wave rectifier 318 (diodes 330, 332, 334, and 336). Output 320 of the full wave rectifier 318 presents a positive DC power supply to circuit 340. Output 322 presents a negative DC power supply. Since the voltage on line 324 varies but remains positive, it may be considered a variable DC power supply. Alternatively, a half-wave rectifier may be used in place of the full wave rectifier 320.

The capacitor C1 peak charge current may be limited by the current regulator circuit 342, which may have components such as resistors R1, R2, and R3, and transistors Q1 and Q2. The peak current may be limited or regulated to approximately VBEQ2/R3, where VBEQ2 is the voltage across the base-emitter junction of transistor Q2. Resistor R2 may be set to a relatively large value, so that the current through resistor R2 may be very small in comparison to the current through resistor R3.

As an example, values that may be used in embodiments are resistor R3=1.5 ohms, capacitor C1=56 uF, K1=30A PCB relay with 24V DC coil. In this example, the capacitor C1 peak charge current may be limited to approx. 400-500 mA peak. Resistor R1 may be set to approximately 4.7 ohms with the purpose of protecting the circuit during voltage surge conditions. Below the limiting or regulating threshold, the charge current follows a typical (R1+R3) C1 charge response. i.e. $I(t)=[(VBRIDGE-VCEQ1)/(R1+R3)] e^{-t/((R1+R3)C1)}$. The limiting of the charge current may allow the total charge current of multiple circuits 350 to remain within the reliable switching capacity of the external control relays (e.g. switches 316 in thermostat 314, and any component switches of power supply 310). The other components of circuit 340 may be added to provide the actuation control for the power relay K1. As an example, the relay K1 may be used as an electric heat control, and the load may be an electrically resistive heating element. The load may be any other type of HVAC component, such as a compressor or fan motor.

Still referring to FIG. 3, capacitor C1 may be charged through the regulator circuit 342. When the voltage across capacitor C1 (the voltage may be referred to as VC1 hereinafter) reaches a predetermined voltage threshold as set by divider resistor R4 and divider resistor R5 in parallel with resistor R7, transistor Q3 may turn on. When transistor Q3 turns on, a voltage equal to VC1 minus the voltage across the collector/emitter terminals of transistor Q3 may be applied to the relay coil K1. The relay K1 may actuate whenever the voltage across the coil exceeds the relay pick-up voltage. The K1 relay remains closed as long as the input voltage to circuit 340 is applied. As an example, resistors R4, R5 and R7 may have values of 22KSΩ, 1.5KΩ and 10KΩ, respectively. This may equate to an approximate switching threshold of 12V.

Regenerative feedback may be provided by resistor R6, transistor Q4 and resistor R7. This portion of the circuit may provide a sharp turn on/turn off characteristic as well as switching threshold hysteresis. When VC1 is below the switching threshold, transistor Q3 may be OFF and transistor Q4 may be ON. With transistor Q4 ON, resistor R7 may be placed in parallel with resistor R5. This effectively sets the VC1 charging switching threshold higher than the VC1 discharging threshold since transistor Q4 turns OFF when transistor Q3 turns ON. Resistor R7 is removed from the divider network, thereby lowering the VC1 switching threshold. When the 24 VAC control signal is removed, capacitor C1 may begin to discharge. This discharge rate may be very slow in comparison to the charge rate due to the high impedance discharge path. The high impedance may be due to the K1 relay coil impedance which may be about the 500Ω range. The capacitor C1 discharge to charge rate may be on the order of 100:1. Without the switching threshold control, the slow discharge may be very detrimental to the K1 relay life. The slow decreasing voltage across the coil may transition through the drop out voltage region thereby reducing contact pressure and creating unstable operation which could result in relay chatter. In other words, the relay contacts may open and close rapidly, or otherwise undergo oscillations in the actuation pressure that may degrade the relay contacts and/or result in reduced life of the relay contacts. The control circuit allows the rapid removal of K1 coil voltage by turning off transistor Q3 whenever VC1 falls to a sufficient voltage level so as to eliminate this undesirable condition. Diode D1 may prevent high voltages from back EMF due to the DC coil inductance when the coil is switched off by Q3. Zener diode D2 may be used to reduce the relay off time by decreasing the back EMF voltage across the coil.

The circuit depicted in FIG. 4 is substantially similar to FIG. 3 except for the threshold switching circuit 344 depicted in circuit 340. The circuit 344 of FIG. 4 may offer an alternative implementation that accomplishes substantially similar operation as the circuit of FIG. 3. The circuit 344 may provide a switching threshold that may be temperature compensated. The temperature compensation may be inherent in the precision voltage reference device 346. The precision voltage reference device 346 may comprise a TL431 programmable shunt regulator (PSR). The TL431 PSR may be configured to operate as a comparator. The threshold voltage may be set by divider resistor R4 and resistor R5. When the threshold voltage is reached, the TL431 PSR may activate the relay coil. Hysteresis may not be present in this embodiment but may be added in alternative embodiments. The circuit 344 may comprise sharp switching characteristics due to the high gain of the TL431 PSR so hysteresis may not be considered necessary. Threshold switching circuit 344 may provide a reduced component design as compared to the embodiment of FIG. 3.

Referring now to FIG. 5, a flowchart of a method 500 of operating a power relay in an HVAC system is illustrated. The method 500 may begin at block 510 by providing a variable direct current source from a thermostat relay is contemplated. This may be achieved by providing an alternating current power source comprising a hot component and a neutral component. For example, the hot component could be a 24 VAC power signal, and the neutral component could be ground. In alternative embodiments, other voltages may be utilized. A hot component may be thermostatically controlled by a relay in a thermostat. The relay in the thermostat may be actuated with dependence on ambient indoor temperature. The thermostat relay may alternatively and/or additionally be actuated with dependence on a humidity, an air quality, and/or any other relevant HVAC related environmental parameter. The neutral component may be switched using a heater interlock relay. Other switching arrangements may be used. The circuit may be configured not to operate without a neutral supply line.

Rectifying the AC power source voltage using a full wave rectifier bridge is also contemplated by this disclosure. The rectifier bridge may receive the hot power input and the neutral power input. The rectifier bridge may further supply the variable DC source comprising a variable positive DC source and negative DC source at output terminals on the rectifier bridge.

The method 500 may continue at 520 by regulating current from the positive DC supply using a current source circuit. This may comprise resisting the current flow using a resistor, and switching the current using a high gain transistor. The method may comprise limiting the current through the high gain transistor by matching a desired current through a low resistance with the voltage drop across the base-emitter junction of a second transistor, and using the second transistor to lower the voltage at the base of the high gain transistor when the current exceeds a desired current limit.

The method 500 may continue at 530 by charging a first capacitor to a first voltage using regulated current from the first current source circuit. The first voltage may comprise a threshold voltage which is desired before attempting to apply voltage to the DC relay coil. The first voltage may be set at a safe margin above a minimum pick-up voltage needed to drive a DC relay coil.

The method 500 may continue at block 540 by applying a second voltage to a base of a first transistor, the second voltage being a first fraction of the first voltage. Here, the method may comprise dividing the first voltage to provide a fraction of the first voltage to the base of the first transistor.

The method 500 may continue at 550 by turning on the first transistor to cause the charged capacitor and current source circuit to energize a power relay coil in an HVAC system. The turn-on voltage may be set by the second voltage, which in turn may be set by the first voltage.

The method 500 may continue at 560 by applying a third voltage to the base of the first transistor, the third voltage being a second fraction of the first voltage, wherein the second fraction may be larger than the first fraction, and wherein applying a third voltage to the base of the first transistor comprises turning off a second transistor to change the value of a voltage divider connected to the base of the first transistor.

The method 500 may also comprise a process for disconnecting the AC signal. The method 500 may comprise limiting the back EMF from the relay coil through a Zener diode. The method 500 may comprise using a common diode in series with the Zener diode to reduce the relay off time by decreasing the back EMF voltage across the relay coil.

Figure 6:
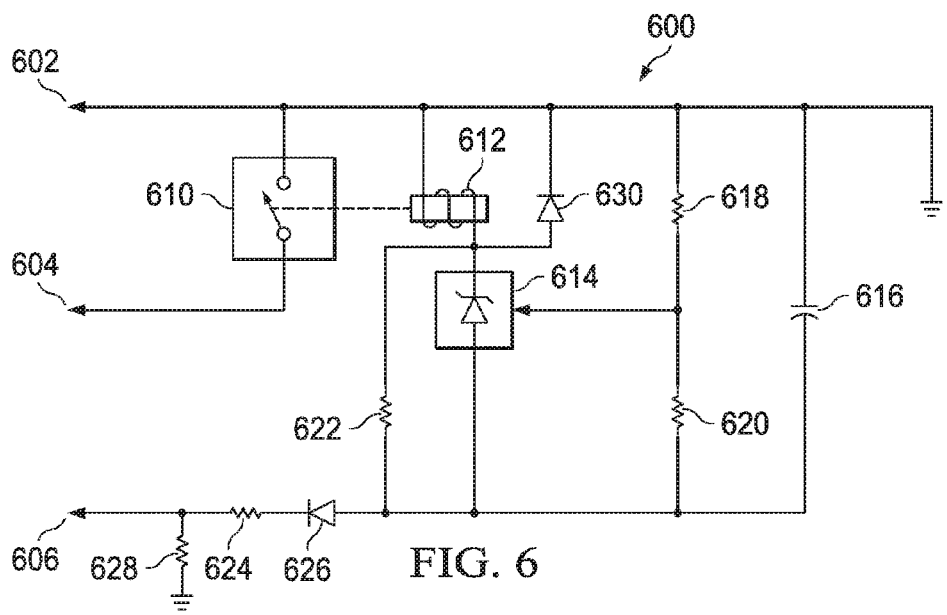
FIG. 6 is a diagram of a heater interlock fan circuit according to another embodiment of the disclosure.

FIG. 6 illustrates a Heater Interlock Fan (HIF) control circuit 600. In some embodiments, HIF control circuit 600 may be used in place of circuit 360 to actuate the Heater Interlock Fan relay 312 of FIG. 3 and/or FIG. 4. The HIF control circuit 600 may be used to prevent a heater circuit relay from functioning when a fan is not functioning. If a fan associated with a heater is not powered on, the heater will not be powered on, which may help prevent overheating of the heater.

FIG. 6 illustrates three terminals 602, 604, and 606 in an HVAC system. Terminal 602 may be associated with a common or ground lead for a 24 VAC supply. Terminal 602 may be connected to 328 in FIG. 3 and FIG. 4. Terminal 604 may be associated with an auxiliary heat input "WJ" or "W2", and may be connected, for example, to full wave rectifier input 321 in FIG. 3 and FIG. 4. Terminal 606 may be associated with a Fan Relay input, which may be designated "G". Terminal 606 may provide a 24 VAC signal when a fan associated with a heater is powered on.

Relay 610 may be actuated by coil 612. Relay 610 may be, for example, the interlock switch 312 shown in FIG. 3 and FIG. 4. Relay 610 may comprise a plurality of contacts and throws, in order to increase current carrying capacity as necessary. Coil 612 may be energized by programmable shunt regulator 614. The programmable shunt regulator may energize coil 612 when the voltage across capacitor 616 reaches a predetermined threshold. The predetermined threshold may be set by resistors 618 and 620. Resistors 618 and 620 form a voltage divider which may be used to present a fraction of the voltage across capacitor 616 at the programming terminal of programmable shunt regulator 614. In this way, the predetermined threshold may be set by the ratio of resistances of resistors 618 and 620.

Additional elements may be present in HIF control circuit 600. A 24 VAC power signal may be applied to terminal 606, as previously described. Resistor 624 may be used to set an upper bound on in-rush current. Diode 626 may serve as a half-wave rectifier of the 24 VAC voltage, to supply a negative DC current. Load resistor 628 may be used as a terminating load, for example when diode 626 is reverse biased. Resistor 622 may be optionally included between the negative supply and a terminal of coil 612. Clamp diode 630 may be used to dissipate a back emf when coil 612 is switched off.

As used herein, the term "terminal" may refer to a conductive lead or wire, a conductive post, a conductive bump, a conductive ring, a plug, a conductive rod, a conductive fitting, pin, prong, bolt, stud, clip, tab, threaded hole, braid ending, brush, or any other conductive extension or receptacle. As such, a terminal may conceptually represent electrically connected and/or equivalent component parts that are formed as integrated units. For example, it is possible to form a capacitor, resistor, and inductor from wire or on a circuit board from metal traces, and in some cases, a terminal may refer to an arbitrary point along a wire or metal trace connecting electrical components. A terminal may also be considered to be synonymous with a node, connection, junction, and/or a trace. While a terminal may be metallic, a terminal may be formed of any conductive or semi-conductive material.

While the terms "base", "emitter", and "collector" have been used to describe the terminals of transistors which in some embodiments may be bipolar transistors, other transistor technologies may be used, such as MOSFET, JFET, CMOS, or any other suitable transistor type. The terminals of different transistors may have different names, such as gate, source and drain, which designate functions similar to bipolar transistors, as will be appreciated by persons skilled in the art.

It will be appreciated that one or more of the circuits of FIGS. 3 and 4 may be utilized in components of an HVAC system, such as, but not limited to, HVAC system 100. For example, an HVAC system controller, such as, but not limited to, an HVAC system controller 106, may comprise one or more of the above-described circuits so that HVAC system 100 components may be switched on and off.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A heating, ventilation, and/or air conditioning (HVAC) switching circuit, comprising:
    an alternating current (AC) power source;
    at least one external control signal relay connected to the AC power source;
    an interlock switch connected to the AC power source;
    a full wave rectifier configured to receive an alternating current (AC) from the AC power source and output a direct current (DC) when each of the at least one external control signal relay and the interlock switch are closed; and a power relay activation control circuit comprising at least one capacitor, wherein the power relay activation control circuit is configured to receive the direct current from the full wave rectifier and provide actuation control of a power relay in response to a voltage exceeding a predetermined threshold switching voltage.

2. The heating, ventilation, and/or air conditioning (HVAC) switching circuit of claim 1, wherein the at least one external control signal relay is located within a thermostat configured to operate the HVAC system in each of a cooling mode and a heating mode.

3. The heating, ventilation, and/or air conditioning (HVAC) switching circuit of claim 1, wherein the interlock switch is configured to allow operation of the power relay activation control circuit when the interlock switch is closed.

4. The heating, ventilation, and/or air conditioning (HVAC) switching circuit of claim 3, wherein the full wave rectifier is configured to receive the alternating current (AC) from the AC power source when the interlock switch is closed.

5. The heating, ventilation, and/or air conditioning (HVAC) switching circuit of claim 3, wherein the interlock switch is configured to prevent operation of the power relay activation control circuit when the interlock switch is open.

6. The heating, ventilation, and/or air conditioning (HVAC) switching circuit of claim 4, wherein the interlock switch is controlled by a circuit configured to limit turn-on and turn-off times of the interlock switch.

7. The heating, ventilation, and/or air conditioning (HVAC) switching circuit of claim 1, wherein the full wave rectifier is configured to output the direct current (DC) to the power relay activation control circuit.

8. The heating, ventilation, and/or air conditioning (HVAC) switching circuit of claim 7, wherein the power relay activation control circuit is configured to provide actuation control of the power relay when the voltage of the direct current (DC) across the capacitor of the power relay activation circuit exceeds the predetermined threshold switching voltage.

9. The heating, ventilation, and/or air conditioning (HVAC) switching circuit of claim 1, wherein actuation of the power relay is temperature compensated.

10. A heating, ventilation, and/or air conditioning (HVAC) system, comprising:
an alternating current (AC) power source;
a thermostat comprising at least one external control signal relay connected to the AC power source;
an interlock switch connected to the AC power source;
a full wave rectifier configured to receive an alternating current (AC) from the AC power source and output a direct current (DC) when each of the at least one external control signal relay and the interlock switch are closed; and
a power relay activation control circuit comprising at least one capacitor, wherein the power relay activation control circuit is configured to receive the direct current from the full wave rectifier and provide actuation control of a power relay in response to a voltage exceeding a predetermined threshold switching voltage.

11. The heating, ventilation, and/or air conditioning (HVAC) system of claim 10, wherein the thermostat is configured to operate the HVAC system in each of a cooling mode and a heating mode.

12. The heating, ventilation, and/or air conditioning (HVAC) system of claim 10, wherein the interlock switch is configured to allow operation of the power relay activation control circuit when the interlock switch is closed, and wherein the full wave rectifier is configured to receive the alternating current (AC) from the AC power source when the interlock switch is closed.

13. The heating, ventilation, and/or air conditioning (HVAC) system of claim 12, wherein the interlock switch is configured to prevent operation of the power relay activation control circuit when the interlock switch is open.

14. The heating, ventilation, and/or air conditioning (HVAC) system of claim 10, wherein the full wave rectifier is configured to output the direct current (DC) to the power relay activation control circuit.

15. The heating, ventilation, and/or air conditioning (HVAC) switching circuit of claim 14, wherein the power relay activation control circuit is configured to provide actuation control of the power relay when the voltage of the direct current (DC) across the capacitor of the power relay activation circuit exceeds the predetermined threshold switching voltage.

16. The heating, ventilation, and/or air conditioning (HVAC) system of claim 10, wherein actuation of the power relay is temperature compensated.

17. The heating, ventilation, and/or air conditioning (HVAC) system of claim 10, wherein the at least one external control signal relay of the thermostat is actuated in response to a measured ambient indoor temperature.

18. A method of operating a heating ventilation and/or air conditioning (HVAC) system, comprising:
providing an alternating current (AC) power source to a thermostat comprising at least one external control signal relay connected to the AC power source;
providing an interlock switch coupled to the thermostat;
receiving an alternating current (AC) from the AC power source and outputting a direct current (DC) when each of the at least one external control signal relay and the interlock switch are closed;
receiving the direct current from the full wave rectifier by a power relay activation control circuit; and
actuating control of a power relay in response to a voltage exceeding a predetermined threshold switching voltage.

19. The method of claim 15, further comprising:
preventing operation of the power relay activation control circuit when the interlock switch is open.

20. The method of claim 15, further comprising:
actuating the at least one external control signal relay of the thermostat in response to a measured ambient indoor temperature.

* * * * *